ized Patent (12) United States Patent
Ha et al.

(10) Patent No.: US 10,628,359 B2
(45) Date of Patent: Apr. 21, 2020

(54) STORAGE MANAGEMENT SYSTEM AND METHOD (71) Applicant: EMC IP Holding Company, LLC, Hopkinton, MA (US)

(72) Inventors: Justin L. Ha, Hayward, CA (US); Frederick Kwan Hang Lee, Mountain view, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 114 days.

(21) Appl. No.: 15/909,274

(22) Filed: Mar. 1, 2018

(65) Prior Publication Data

US 2019/0272244 A1 Sep. 5, 2019

(51) Int. Cl.
G06F 13/37 (2006.01)
G06F 13/16 (2006.01)
G06F 3/06 (2006.01)

(52) U.S. Cl.
CPC .............. G06F 13/37 (2013.01); G06F 3/061 (2013.01); G06F 3/0604 (2013.01); G06F 3/0659 (2013.01); G06F 3/0679 (2013.01); G06F 13/16 (2013.01); G06F 2213/0026 (2013.01)

(58) Field of Classification Search
CPC ...... G06F 13/37; G06F 3/0659; G06F 3/0679; G06F 3/061; G06F 3/0604; G06F 13/16; G06F 2213/0026
See application file for complete search history.

(56) References Cited

U.S. PATENT DOCUMENTS

2014/0108708 A1* 4/2014 Borchers .............. G06F 3/0613 711/103
2019/0042489 A1* 2/2019 Nagabhushana ... G06F 13/1668

* cited by examiner

Primary Examiner — David Yi
Assistant Examiner — Zubair Ahmed
(74) Attorney, Agent, or Firm — Brian J. Colandreo; Mark H. Whittenberger; Holland and Knight LLP (57) ABSTRACT A method, computer program product, and computing system for determining a maximum quantity of unit write operations serviceable by a data bus coupled to a memory system. A first data stream is received for writing data to the memory system. A first unit write operation is assigned to the first data stream. One or more supplemental unit write operations are assigned to the first data stream as needed provided that the one or more supplemental unit write operations do not result in the total unit write operations exceeding the maximum quantity of unit write operations.

21 Claims, 4 Drawing Sheets

STORAGE MANAGEMENT SYSTEM AND METHOD

TECHNICAL FIELD

This disclosure relates to storage management systems and, more particularly, to storage management systems that increase the efficiency of data storage operations.

BACKGROUND

Storing and safeguarding electronic content is of paramount importance in modern business. Accordingly, various methodologies may be employed to protect and distribute such electronic content, wherein the storage systems that process such content may strive to do so in as an efficient manner as possible. Unfortunately and due to inherent limitations in some of the memory technology utilized in such storage systems, complex methodologies may need to be utilized in order to navigate around such inherent shortcomings.

SUMMARY OF DISCLOSURE

In one implementation, a computer-implemented method is executed on a computing device and includes determining a maximum quantity of unit write operations serviceable by a data bus coupled to a memory system. A first data stream is received for writing data to the memory system. A first unit write operation is assigned to the first data stream. One or more supplemental unit write operations are assigned to the first data stream as needed provided that the one or more supplemental unit write operations do not result in the total unit write operations exceeding the maximum quantity of unit write operations.

One or more of the following features may be included. The data may be written to data blocks defined within the first unit write operation in a round-robin fashion. The unit write operations may be grid block unit write operations. The data bus may be a PCIe data bus. The memory system may be an SSD memory system. An additional data stream may be received for writing data to the memory system. One or more additional unit write operations may be assigned to the additional data stream as needed provided that the one or more additional unit write operations do not result in the total unit write operations exceeding the maximum quantity of unit write operations. Assigning one or more supplemental unit write operations to the first data stream as needed may include assigning one or more supplemental unit write operations to the first data stream if a busy condition is sensed with respect to the first unit write operation.

In another implementation, a computer program product resides on a computer readable medium and has a plurality of instructions stored on it. When executed by a processor, the instructions cause the processor to perform operations including determining a maximum quantity of unit write operations serviceable by a data bus coupled to a memory system. A first data stream is received for writing data to the memory system. A first unit write operation is assigned to the first data stream. One or more supplemental unit write operations are assigned to the first data stream as needed provided that the one or more supplemental unit write operations do not result in the total unit write operations exceeding the maximum quantity of unit write operations.

One or more of the following features may be included. The data may be written to data blocks defined within the first unit write operation in a round-robin fashion. The unit write operations may be grid block unit write operations. The data bus may be a PCIe data bus. The memory system may be an SSD memory system. An additional data stream may be received for writing data to the memory system. One or more additional unit write operations may be assigned to the additional data stream as needed provided that the one or more additional unit write operations do not result in the total unit write operations exceeding the maximum quantity of unit write operations. Assigning one or more supplemental unit write operations to the first data stream as needed may include assigning one or more supplemental unit write operations to the first data stream if a busy condition is sensed with respect to the first unit write operation.

In another implementation, a computing system includes a processor and memory is configured to perform operations including determining a maximum quantity of unit write operations serviceable by a data bus coupled to a memory system. A first data stream is received for writing data to the memory system. A first unit write operation is assigned to the first data stream. One or more supplemental unit write operations are assigned to the first data stream as needed provided that the one or more supplemental unit write operations do not result in the total unit write operations exceeding the maximum quantity of unit write operations.

One or more of the following features may be included. The data may be written to data blocks defined within the first unit write operation in a round-robin fashion. The unit write operations may be grid block unit write operations. The data bus may be a PCIe data bus. The memory system may be an SSD memory system. An additional data stream may be received for writing data to the memory system. One or more additional unit write operations may be assigned to the additional data stream as needed provided that the one or more additional unit write operations do not result in the total unit write operations exceeding the maximum quantity of unit write operations. Assigning one or more supplemental unit write operations to the first data stream as needed may include assigning one or more supplemental unit write operations to the first data stream if a busy condition is sensed with respect to the first unit write operation.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
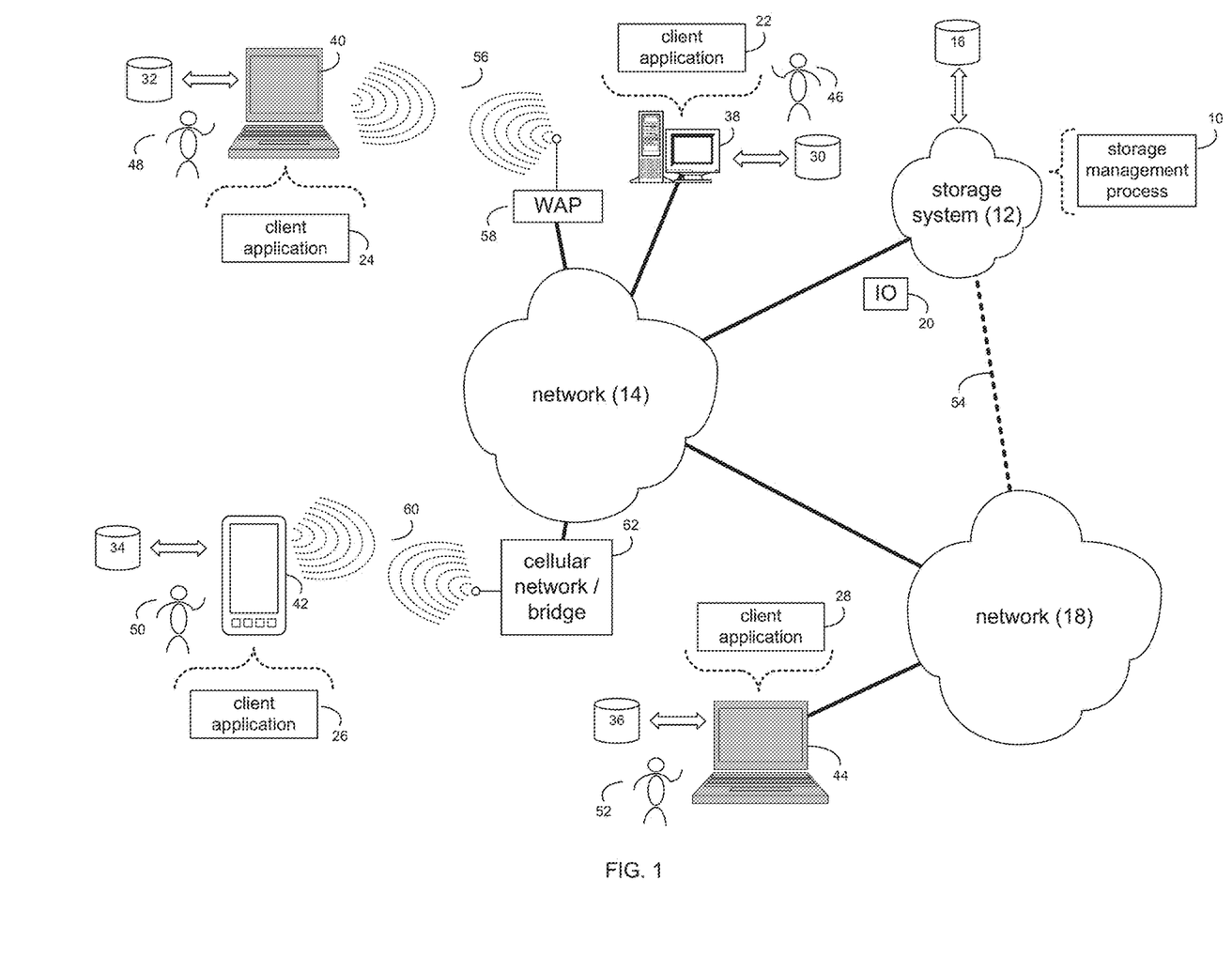
FIG. 1 is a diagrammatic view of a storage system and a storage management process coupled to a distributed computing network.

System Overview:

Referring to FIG. 1, there is shown storage management process 10 that may reside on and may be executed by storage system 12, which may be connected to network 14 (e.g., the Internet or a local area network). Examples of storage system 12 may include, but are not limited to: a personal computer with a memory system, a server computer with a memory system, a Network Attached Storage (NAS) system, a Storage Area Network (SAN) and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows Server™, Redhat Linux™, Unix, or a custom operating system, for example.

The instruction sets and subroutines of storage management process 10, which may be stored on storage device 16 coupled to storage system 12, may be executed by one or more processors (not shown) and one or more memory architectures (not shown) included within storage system 12. Storage device 16 may include but is not limited to: a hard disk drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices (e.g., client electronic devices 38, 40, 42, 44) may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft Windows™, Apple Macintosh™, Redhat Linux™, or a custom operating system.

Figure 2:
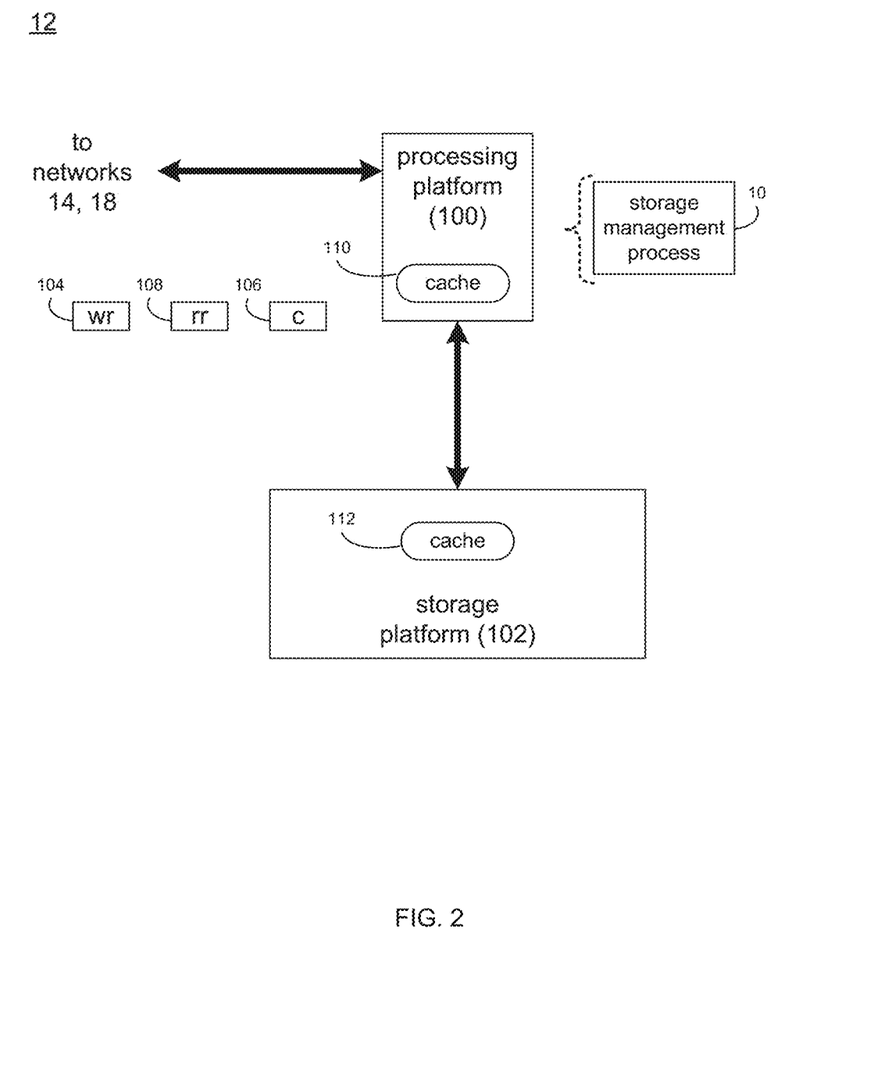
FIG. 2 is a diagrammatic view of the storage system of FIG. 1.

The Data Storage System:

Referring also to FIG. 2, there is shown a general implementation of storage system 12. In this general implementation, storage system 12 may include processing platform 100, wherein processing platform 100 may be configured to perform computational tasks and may be configured to store data within storage platform 102.

Depending on the manner in which storage system 12 is configured, storage platform 102 may include a single storage devices (such as a single hard disk drive or a single solid state storage device) or may include a plurality of storage devices that are configured to provide various levels of performance and/or high availability. For example and if storage platform 102 includes a plurality of storage devices (e.g., hard disk drives and/or solid state storage devices), this plurality of storage devices may be configured to form a RAID array utilizing various standard RAID structures (e.g., RAID 0, RAID 1, RAID 3, RAID 5, RAID 6, RAID 7 or RAID 10), thus providing a higher level of performance and/or availability.

Storage system 12 may be configured to execute all or a portion of storage management process 10. The instruction sets and subroutines of storage management process 10, which may be stored on a storage device (e.g., storage device 16) coupled to processing platform 100, may be executed by one or more processors (not shown) and one or more memory architectures (not shown) included within processing platform 100. Storage device 16 may include but is not limited to: a hard disk drive; a RAID device; a random access memory (RAM); a read-only memory (ROM); and all forms of flash memory storage devices.

As discussed above, various IO requests (e.g. IO request 20) may be generated. For example, these IO requests may be sent from client applications 22, 24, 26, 28 to storage system 12. Additionally/alternatively and when storage system 12 is configured as an application server, these IO requests may be internally generated within storage system 12. Examples of IO request 20 may include but are not limited to data write request 104 (i.e. a request that content 106 be written to storage system 12) and data read request 108 (i.e. a request that content 106 be read from storage system 12).

During operation of processing platform 100, content 106 to be written to storage system 12 may be processed by processing platform 100. Additionally/alternatively and when storage system 12 is configured as an application server, content 106 to be written to storage system 12 may be internally generated by processing platform 100.

Processing platform 100 may include cache memory system 110. Examples of cache memory system 110 may include but are not limited to a volatile, solid-state, cache memory system (e.g., a dynamic RAM cache memory system) and/or a non-volatile, solid-state, cache memory system (e.g., a flash-based, cache memory system). Processing platform 100 may initially store content 106 within cache memory system 110. Depending upon the manner in which cache memory system 110 is configured, processing platform 100 may immediately write content 106 to storage platform 102 (if cache memory system 110 is configured as a write-through cache) or may subsequently write content 106 to storage platform 102 (if cache memory system 110 is configured as a write-back cache).

Storage platform 102 may include cache memory system 112. Examples of cache memory system 112 may include but are not limited to a volatile, solid-state, cache memory system (e.g., a dynamic RAM cache memory system) and/or a non-volatile, solid-state, cache memory system (e.g., a flash-based, cache memory system). During operation of storage platform 102, content 106 to be written to storage platform 102 may be received from processing platform 100. Storage platform 102 may initially store content 106 within cache memory system 112 prior to being stored on e.g. the one or more of storage devices included within storage platform 102.

For the following discussion, storage management process 10 is described as controlling the manner in which data (e.g., content 106) is written to and/or read from the various memory devices/memory systems included within storage system 12. According, the following discussion may concern the manner in which storage management process 10 controls the writing of data to (and/or the reading of data from) storage platform 102, the writing of data to (and/or the reading of data from) cache memory system 110, and/or the writing of data to (and/or the reading of data from) cache memory system 112.

Figure 3:
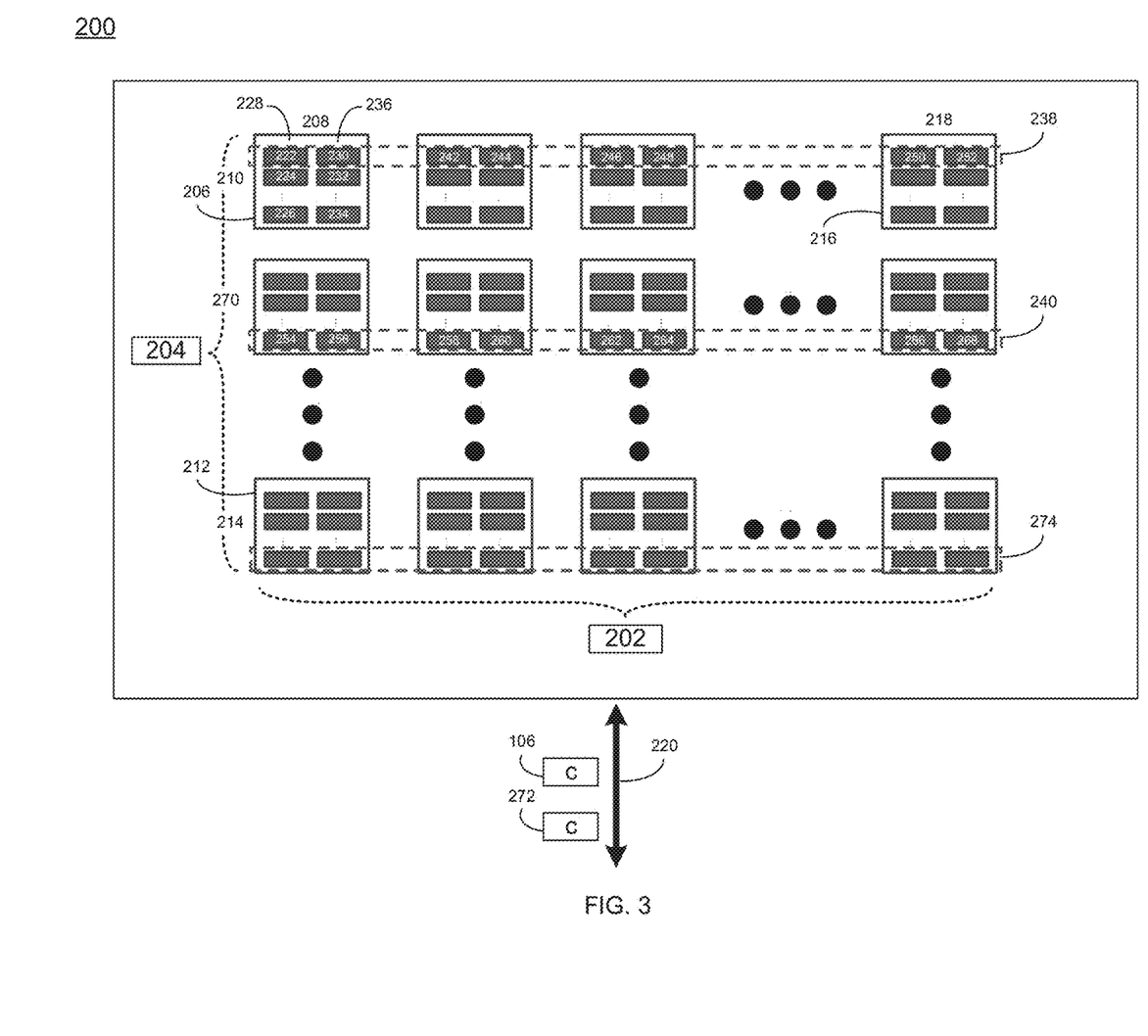
FIG. 3 is a diagrammatic view of a storage device for use with the storage system of FIG. 2.

Referring also to FIG. 3, there is shown storage device 200 (e.g., all or a portion of storage platform 102, cache memory system 110 and/or cache memory system 112) to which storage management process 10 may write content 106 (or from which storage management process 10 may read content 106). One example of storage device 200 may include but is not limited to a solid state storage device (e.g., an SSD memory system), such as a flash storage device. Storage device 200 may be divided into a plurality of storage units (e.g., LUNS) that are located via channels (e.g., channels 202) and dies (e.g., dies 204) to form an array of LUNs. For example, storage device 200 may include 32 channels and 16 dies, resulting in 512 storage units (e.g., LUNS). Specifically, LUN 206 is shown being located @ Channel 208/Die 210; while LUN 212 is shown being located @ Channel 208/Die 214; and LUN 216 is located @ Channel 218/Die 210. Storage device 200 may be coupled to e.g., processing platform 100 via data bus 220, an example of which may include but is not limited to a PCIe data bus.

Each LUN (e.g., LUNs, 206, 212, 216) may include a plurality of memory blocks that may be arranged in a plurality of planes. For example, LUN 206 may include thirty-two memory blocks, where a first group of sixteen memory blocks (e.g., memory blocks 222, 224 . . . 226) are located in plane 228 and a second group of sixteen memory blocks (e.g., memory blocks 230, 232 . . . 234) are located in plane 236. In order to enhance efficiency, when writing data to these memory blocks (e.g., memory blocks 222, 224, 226, 230, 232, 234) within the various LUNs (e.g., LUN 206) of storage device 200, data may be written in unit write operations that span multiple LUNs and multiple channels, thus allowing a group of memory blocks to be processed in one memory operation. An example of such a unit write operation may include a grid block unit write operation, wherein all of the memory blocks within a grid block (e.g., grid block 238 or grid block 240) may be processed in one memory operation.

For example, grid blocks 238, 240 are shown to span all "common-row" memory blocks (i.e., memory blocks within a LUN that have the same row identifier) for all of the LUNs in a particular die. Specifically, grid block 238 is shown to span all "Row 0" memory blocks (e.g., memory blocks 222, 230, 242, 244, 246, 248, 250, 252) for all of the LUNs in the group (e.g., die 210), while grid block 240 is shown to span all "Row 15" memory blocks (e.g., memory blocks 254, 256, 258, 260, 262, 264, 266, 268) for all of the LUNs in the group (e.g., die 270).

Figure 4:
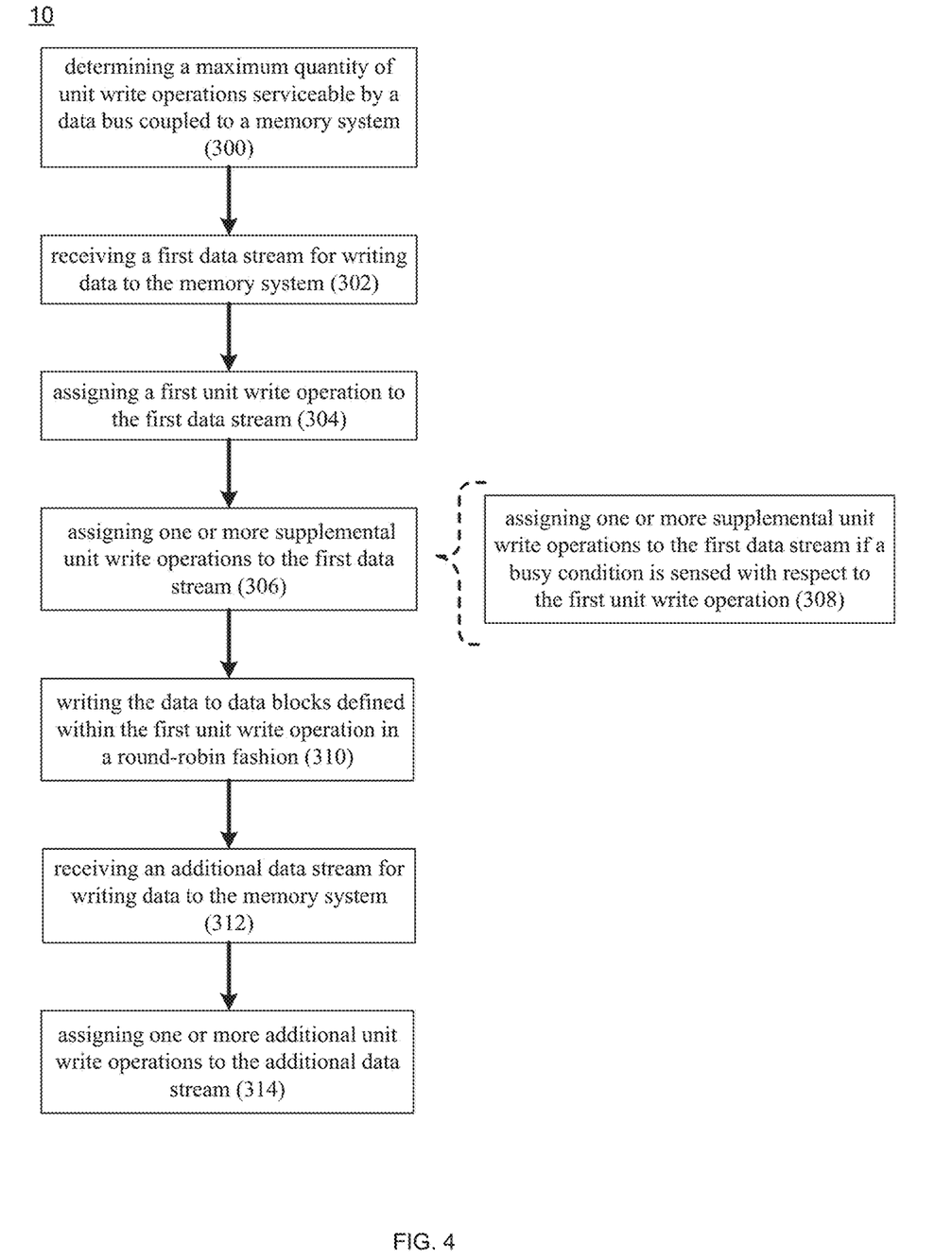
FIG. 4 is a flow chart of the storage management process of FIG. 1.

Referring also to FIG. 4, in order to enhance the efficiency of storage device 200, that rate at which data (e.g., content 106) is written to storage device 200 should be maximized whenever possible. Accordingly, storage management process 10 may saturate (i.e., fully utilize) the available bandwidth of data bus 220 whenever possible.

As discussed above, an example of data bus 220 is a PCIe data bus. So while the following discussion concerns a PCIe data bus, this is for illustrative purposes only and is not intended to be a limitation of this disclosure, as other configurations are possible and are considered to be within the scope of this disclosure. For example, other types of bus configurations may be utilized and the following figures may need to be adjusted.

However and continuing with the example in which data bus 220 is a PCIe data bus, one example of such a PCIe data bus may include four data lanes that each have a bandwidth of approximate 1.0 gigabyte per second; resulting in a total bandwidth of 4.0 gigabytes per second for (in this example) data bus 220. Again and as discussed above, this is for illustrative purposes only and is not intended to be a limitation of this disclosure, as other configurations are possible and are considered to be within the scope of this disclosure. For example, the number of lanes include within data bus 220 may be e.g., one lane, two lanes, four lanes, eight lanes, sixteen lanes, etc. Further, the lane bandwidth of one gigabyte per second is also for illustrative purposes only, wherein it is foreseeable that these lane bandwidths will increase as technological advancements are made.

For the example in which storage device 200 is an SSD storage device, each memory block may have a capacity of three 16 kilobyte memory pages, wherein there is one memory block per plane, wherein there are two planes per LUN, and wherein there are 32 LUNs per grid block. Accordingly and when utilizing NAND technology, writing to (in this example) the 32 LUNs within grid block 238 (or grid block 240) would require the writing of approximately 3.0 megabytes of data and would take approximately 3.5 milliseconds; resulting in a transfer rate of approximately 830 megabytes per second (or approximately 20% of the maximum bandwidth of data bus 220). Accordingly and in order maximize the rate at which data (e.g., content 106) is written to storage device 200, storage management process 10 should attempt to perform multiple grid block write operations simultaneously to saturate (i.e., fully utilize) data bus 220.

Accordingly, storage management process 10 may determine 300 a maximum quantity of unit write operations serviceable by a data bus (e.g., data bus 220) coupled to a memory system (e.g., storage device 200). This determination 300 may be made "on the fly" or may be predetermined based upon the physical properties of data bus 220. For example, and as discussed above, storage management process 10 may determine 300 that the maximum quantity of unit write operations (e.g., grid block unit write operations) that are serviceable by the data bus (e.g., data bus 220) is five, as five grid block unit write operations (at 830 megabytes per second) would fully saturate (i.e., utilize) data bus 220 that couples storage device 200 to e.g., processing platform 100.

Upon storage management process 10 receiving 302 a first data stream for writing data to the memory system (e.g., a data stream to write content 106 to storage device 200), storage management process 10 may assign 304 a first unit write operation (e.g., writing content 106 to grid block 238), thus utilizing one of the available five unit write operations that may be simultaneously serviced by data bus 220.

Storage management process 10 may monitor the manner in which content 106 is being written to storage device 200 and may assign 306 one or more supplemental unit write operations (e.g., supplementally writing to grid block 240) to the first data stream (e.g., a data stream to write content 106 to storage device 200) as needed . . . provided that the one or more supplemental unit write operations (e.g., writing content 106 to grid block 240) do not result in the total unit write operations exceeding the maximum quantity of unit write operations (which, as discussed above, is five).

Specifically and when assigning 306 one or more supplemental unit write operations (e.g., writing content 106 to grid block 240) to the first data stream (e.g., a data stream to write content 106 to storage device 200) as needed, storage management process 10 may assign 308 one or more supplemental unit write operations to the first data stream if a busy condition is sensed with respect to the first unit write operation.

For example, if content 106 is a smaller data write operation, storage management process 10 may assign 304 a first unit write operation (e.g., writing content 106 to grid block 238), which may be sufficient for processing content 106. However, if a busy condition is sensed with respect to the first unit write operation (e.g., content 106 is taking a longer-than-acceptable amount of time to be written to storage device 200), storage management process 10 may assign 308 one or more supplemental unit write operations (e.g., supplementally writing to grid block 240) to help process the writing of content 106 on an as needed basis; provided that these supplemental unit write operations (e.g., supplementally writing to grid block 240) do not result in the total unit write operations exceeding (in this example) five unit write operations. Since this (in this example) is only the second unit write operation, the limit is not meet or exceeded. Specifically, three more unit write operations may be assigned 308 to processing content 106 before the limit is actually met.

When writing data (e.g., content 106) to storage device 200, storage management process 10 may write 310 the data (e.g., content 106) in a round-robin fashion. For example and with respect to grid block 238, content 106 may first be written to memory block 222 . . . then to memory block 230 . . . then to memory block 242 . . . then to memory block 244 . . . then to memory block 246 . . . then to memory block 248 . . . then to memory block 250 . . . and then to memory block 252. Further and with respect to grid block 240, content 106 may first be written to memory block 254 . . . then to memory block 256 . . . then to memory block 258 . . . then to memory block 260 . . . then to memory block 262 . . . then to memory block 264 . . . then to memory block 266 . . . and then to memory block 268.

As could be imagined, additional data streams may become available for processing while processing earlier received streams (such as content 106). For example, assume that a new piece of data became available for writing to storage device 200, namely content 272. Accordingly and upon receiving 310 an additional data stream for writing data (e.g., content 272) to the memory system (e.g., storage device 200), storage management process 10 may assign 312 one or more additional unit write operations to the additional data stream (e.g., related to content 272) as needed; provided (again) that the one or more additional unit write operations do not result in the total unit write operations exceeding the maximum quantity of unit write operations (which, as discussed above, is five).

Continuing with the above stated example, in which two unit write operation are currently being utilized to process content 106, storage management process 10 may initially assign 314 one unit write operations (e.g., (e.g., writing to grid block 274) to the processing of content 272. As discussed above, storage management process 10 may monitor the manner in which content 272 is being written to storage device 200 and may assign 314 additional unit write operations if a busy condition is sensed. And if a busy condition is sensed by storage management process 10, as a total of three unit write operations are currently being utilized to process content 106 and content 272, two additional unit write operations may be assigned by storage management process 10 before the limit of five is hit.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:
   determining a maximum quantity of unit write operations serviceable by a data bus coupled to a memory system;
   receiving a first data stream for writing data to the memory system;
   assigning a first unit write operation to the first data stream, wherein assigning the first unit write operation to the first data stream includes writing data of the first data stream to the memory system; and
   assigning one or more supplemental unit write operations to the first data stream when writing the data of the first data stream to the memory system is taking longer than a threshold amount of time provided that the one or more supplemental unit write operations do not result in the total unit write operations exceeding the maximum quantity of unit write operations.

2. The computer-implemented method of claim 1 further comprising:
   writing the data to data blocks defined within the first unit write operation in a round-robin fashion.

3. The computer-implemented method of claim 1 wherein the unit write operations are grid block unit write operations.

4. The computer-implemented method of claim 1 wherein:
   the data bus is a PCIe data bus; and
   the memory system is an SSD memory system.

5. The computer-implemented method of claim 1 further comprising:
   receiving an additional data stream for writing data to the memory system.

6. The computer-implemented method of claim 5 wherein further comprising:
   assigning one or more additional unit write operations to the additional data stream as needed provided that the one or more additional unit write operations do not result in the total unit write operations exceeding the maximum quantity of unit write operations.

7. The computer-implemented method of claim 5 wherein assigning one or more supplemental unit write operations to the first data stream includes:
assigning one or more supplemental unit write operations to the first data stream if a busy condition is sensed with respect to the first unit write operation.

8. A computer program product residing on a non-transitory computer readable medium having a plurality of instructions stored thereon which, when executed by a processor, cause the processor to perform operations comprising:
determining a maximum quantity of unit write operations serviceable by a data bus coupled to a memory system;
receiving a first data stream for writing data to the memory system;
assigning a first unit write operation to the first data stream, wherein assigning the first unit write operation to the first data stream includes writing data of the first data stream to the memory system; and
assigning one or more supplemental unit write operations to the first data stream when writing the data of the first data stream to the memory system is taking longer than a threshold amount of time provided that the one or more supplemental unit write operations do not result in the total unit write operations exceeding the maximum quantity of unit write operations.

9. The computer program product of claim 8 further comprising:
writing the data to data blocks defined within the first unit write operation in a round-robin fashion.

10. The computer program product of claim 8 wherein the unit write operation is a grid block unit write operation.

11. The computer program product of claim 8 wherein:
the data bus is a PCIe data bus; and
the memory system is an SSD memory system.

12. The computer program product of claim 8 further comprising:
receiving an additional data stream for writing data to the memory system.

13. The computer program product of claim 12 further comprising:
assigning one or more additional unit write operations to the additional data stream as needed provided that the one or more additional unit write operations do not result in the total unit write operations exceeding the maximum quantity of unit write operations.

14. The computer program product of claim 12 wherein assigning one or more supplemental unit write operations to the first data stream includes:
assigning one or more supplemental unit write operations to the first data stream if a busy condition is sensed with respect to the first unit write operation.

15. A computing system comprising:
a memory; and
a processor configured to determine a maximum quantity of unit write operations serviceable by a data bus coupled to a memory system, the processor further configured to receive a first data stream for writing data to the memory system, the processor further configured to assign a first unit write operation to the first data stream, wherein assigning the first unit write operation to the first data stream includes writing data of the first data stream to the memory system, and the processor further configured to assign one or more supplemental unit write operations to the first data stream when writing the data of the first data stream to the memory system is taking longer than a threshold amount of time provided that the one or more supplemental unit write operations do not result in the total unit write operations exceeding the maximum quantity of unit write operations.

16. The computing system of claim 15 wherein the processor is further configured to write the data to data blocks defined within the first unit write operation in a round-robin fashion.

17. The computing system of claim 15 wherein the unit write operation is a grid block unit write operation.

18. The computing system of claim 15 wherein:
the data bus is a PCIe data bus; and
the memory system is an SSD memory system.

19. The computing system of claim 15 wherein the processor is further configured to receive an additional data stream for writing data to the memory system.

20. The computing system of claim 19 wherein the processor is further configured to assign one or more additional unit write operations to the additional data stream as needed provided that the one or more additional unit write operations do not result in the total unit write operations exceeding the maximum quantity of unit write operations.

21. The computing system of claim 19 wherein assigning, via the processor, one or more supplemental unit write operations to the first data stream includes:
assigning one or more supplemental unit write operations to the first data stream if a busy condition is sensed with respect to the first unit write operation.

* * * * *